United States Patent Office 3,144,463
Patented Aug. 11, 1964

3,144,463
N-(p-AMINOPHENETHYL)- AND N-(p-NITRO-PHENETHYL) - 2 - METHYL - 3 - PHENYL - 3 - PROPIONYLOXY-PYRROLIDINES
John Frederick Cavalla, Isleworth, Middlesex, and Rupert Aleck Selway, Feltham, Middlesex, England, assignors to Parke, Davis & Company, Detroit, Mich., a corporation of Michigan
No Drawing. Filed Jan. 25, 1962, Ser. No. 168,808
Claims priority, application Great Britain Feb. 3, 1961
5 Claims. (Cl. 260—326.3)

The present invention relates to pyrrolidine compounds. More particularly the invention relates to pyrrolidine compounds of the formula

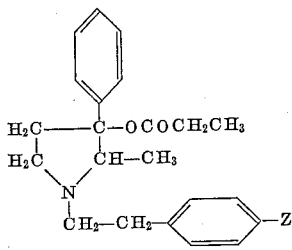

where Z represents an amino(—NH$_2$) or a nitro(—NH$_2$) group, to acid-addition salts thereof and to methods for their production.

In accordance with the invention pyrrolidine compounds having the above formula and acid-addition salts thereof can be produced by reacting 2-methyl-3-phenyl-3 - propionyloxypyrrolidine with a compound having in free base form the formula

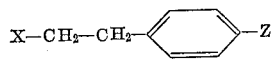

where X is a halogen atom and Z is an amino or a nitro group. The process is preferably carried out by heating the reactants in an unreactive solven such as dimethylformamide at 30–200° C. for up to about 24 hours. The pyrrolidine derivative and the substituted phenethyl halide compound are usually employed in approximately equimolar quantities, although a slight or moderate excess of either can be used. Preferably the reaction is carried out in the presence of an inorganic base such as sodium carbonate in which case the reaction product can be isolated directly as the free base, or converted to an acid-addition salt.

Also in accordance with the invention, 1-p-nitrophenethyl-2-methyl-3-phenyl-3-propionyloxypyrrolidine and its acid-addition salts can be produced by the reaction of 1-p-nitrophenethyl-2-methyl-3-phenyl-3-pyrrolidinol or an acid-addition salt thereof with propionic acid or a reactive derivative thereof. When the process is carried out with propionic acid, an esterification catalyst is normally employed and the reactants are heated in an excess of propionic acid or in an unreactive solvent until a satisfactory yield of the desired ester has been obtained. When the process is carried out with a reactive derivative such as propionic anhydride, propionyl chloride or propionyl bromide, the esterification reaction is usually carried out by heating the reactants in the presence of an organic base such as pyridine at 30–150° C., or at the reflux point of the mixture, for up to about 24 hours, although satisfactory results are also obtained somewhat outside of this range. For reasons of economy it is preferred to use an excess of the propionic acid or its reactive derivative. The product is isolated either as the free base or as an acid-addition salt.

Further in accordance with the invention, 1-p-aminophenethyl-2-methyl-3-phenyl - 3 - propionyloxypyrrolidine and its acid-addition salts are obtained by the reduction of 1-p-nitrophenethyl - 2 - methyl - 3 - phenyl-3-propionyloxypyrrolidine and its acid-addition salts. The reduction can be carried out either by catalytic hydrogenation or by mild chemical reducing agents capable of causing reduction of the nitro group to an amino group. When the reduction is carried out by catalytic hydrogenation good results are obtained by using a noble metal catalyst such as palladium on charcoal and by carrying out the hydrogenation at room temperature at a hydrogen pressure of 1 to 5 atmospheres until approximately the calculated quantity of hydrogen has been absorbed. Higher temperatures and hydrogen pressures can also be used but are unnecessary.

The free bases of the invention form acid-addition salts by reaction with acids such as hydrochloric, hydrobromic, sulfuric, phosphoric, acetic, benzoic, tartaric, maleic, benzenesulfonic and citric acids. The acid-addition salts are converted to the free bases by methods such as treatment with an inorganic base such as sodium hydroxide or sodium carbonate. If desired, the compounds of the invention, either as free bases or as acid-addition salts, can also be obtained in optically active forms by using an optically active pyrrolidine derivative as starting material, or by resolving an optically inactive final product by fractional crystallization of a salt formed with an optically active acid.

The compounds of the invention are pharmacological agents and are chemical intermediates useful in the preparation of other pyrrolidine derivatives. The compounds of the invention possess a high degree of analgetic activity. They are useful as analgesic agents because they have the ability to relieve severe pain without producing deleterious side effects associated with the use of alkaloidal analgesics. The compounds can be administered either orally or parenterally.

The invention is illustrated but not limited by the following examples.

*Example 1*

A stirred mixture of 10 g. of 2-methyl-3-phenyl-3-propionyloxypyrrolidine hydrochloride, 40 ml. of dimethylformamide, 7.6 g. of 2-chloroethyl-p-aminobenzene hydrochloride and 6 g. of sodium carbonate is heated at 110° C. for 16 hours. The mixture is cooled and poured into 300 ml. of ice water. The dark brown oil which precipitates is extracted wtih ether. The ether is removed by evaporation and the residual oil is dissolved in benzene and decolorized with activated charcoal. The solution is filtered and concentrated to give a residue of 1-p-aminophenethyl-2-methyl-3-phenyl-2-propionyloxypyrrolidine. This compounds is converted to the dihydrochloride by treatment in ethereal solution with 2 equivalents of hydrogen chloride; M.P. 233–236° C. and 255–258° C. following crystallizations from isopropyl alcohol-ether mixtures.

*Example 2*

A solution of 13.5 g. of 2-methyl-3-phenyl-3-pripionyl-oxypyrrolidine hydrochloride in 50 ml. of dimethylformamide is treated with 6 g. of sodium carbonate and 11.5 g. of p-nitrophenethyl bromide. The reaction mixture is stirred at 60° C. for 17 hours and then cooled and poured into ice-water. The oily product which precipitates is extracted with a total of 300 ml. of ether in three portions. The ether extracts are combined, dried over magnesium sulfate, and treated with hydrogen chloride to give 1-p-nitrophenethyl-2-methyl-3-phenyl-3-propionyloxypyrrolidine hydrochloride; M.P. 167–170° C. after crystallization from ethanol-ether mixtures. The free base is obtained by dissolving the hydrochloride in water and adding an excess of sodium carbonate.

Example 3

A mixture of 10.7 g. of 1-p-nitrophenethyl-2-methyl-3-phenyl-3-pyrrolidinol, 70 ml. of propionic anhydride and 30 ml. of pyridine is heated at 120° C. for 17 hours and then concentrated in vacuo to a red oil. The last traces of reagents are removed by codistillation with xylene and the residue is extracted with hot petroleum ether. Removal of the solvent yields a residue of 1-p-nitrophenethy-2-methyl-3-phenyl-3-propionyloxypyrrolidine as a red oil. The hydrochloride is obtained by treating an ether solution of the free base with hydrogen chloride; M.P. 177–179° C. after crystallization from ethanol-ether mixtures.

The 1-p-nitrophenethyl-2-methyl-3-phenyl-3-pyrrolidinol used as a starting material can be obtained as follows. 50 g. of 1-benzyl-2-methyl-3-phenyl-3-pyrrolidinol (obtained, for example, by the alkaline hydrolysis of 1-benzyl-2-methyl-3-phenyl-3-propionyloxypyrrolidine or its hydrochloride) in 200 ml. of ethanol is hydrogenated in the presence of 1 g. of 10% palladium on charcoal catalyst. When the calculated quantity of hydrogen has been absorbed, the catalyst is removed by filtration and the filtrate is concentrated to give 2-methyl-3-phenyl-3-pyrrolidinol; M.P. 101–103° C. following crystallization from benzene-petroleum ether mixtures. A solution of 17.7 g. of this product is 100 ml. of dimethylformamide is treated with 27.6 g. of potassium carbonate and then, with stirring, with 23 g. of p-nitrophenethyl bromide. The mixture is stirred at room temperature over night and then poured into ice-water. The insoluble product, 1-p-nitrophenethyl-2-methyl-3-phenyl-3-pyrrolidinol separates as an orange solid; M.P. 133–137° C. after crystallization from ethanol.

Example 4

A solution of 4.2 g. of 1-p-nitrophenethyl-2-methyl-3-phenyl-3-propionyloxypyrrolidine hydrochloride in 100 ml. of ethanol is hydrogenated in the presence of 0.5 g. of 10° palladium on charcoal catalyst. The calculated quantity of hydrogen is rapidly absorbed. The catalyst is removed by filtration and the filtrate acidified with 1 ml. of concentrated hydrochloric acid. This solution is concentrated in vacuo to give 1-p-aminophenethyl-2-methyl-3-phenyl-3-propionyloxypyrrolidine dihydrochloride; M.P. 257–260° C. after crystallization from isopropyl alcohol. The free base is obtained by treating an aqueous solution of the dihydrochloride with a base such as sodium hydroxide or potassium carbonate.

We claim:

1. A member of the class consisting of compounds of the formula

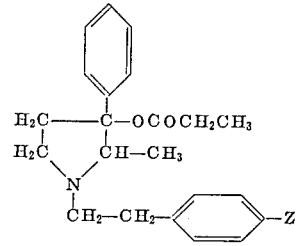

and non-toxic acid-addition salts thereof; where Z is a member of the class consisting of the amino and nitro groups.

2. 1-p-aminophenethyl-2-methyl-3-phenyl-3-propionyloxypyrrolidine.

3. 1-p-aminophenethyl-2-methyl-3-phenyl-3-propionyloxypyrrolidine dihydrochloride.

4. 1-p-nitrophenethyl-2-methyl-3-phenyl-3-propionyloxypyrrolidine.

5. 1-p-nitrophenethyl-2-methyl-3-phenyl-3-propionyloxypyrrolidine hydrochloride.

References Cited in the file of this patent

UNITED STATES PATENTS

| | | |
|---|---|---|
| 2,880,211 | Elpern | Mar. 31, 1959 |
| 2,978,454 | Elpern | Apr. 4, 1961 |
| 3,051,726 | Biel | Aug. 28, 1962 |

OTHER REFERENCES

Elpern et al.: J. American Chemical Society, vol. 80, pages 4916–4918 (1958).